United States Patent
Hetrich et al.

(10) Patent No.: US 11,969,947 B2
(45) Date of Patent: Apr. 30, 2024

(54) TECHNOLOGIES FOR NON-CONTACT DISPLACEMENT CONTROL

(71) Applicant: ABB Schweiz AG, Baden (CH)

(72) Inventors: Matthew Hetrich, Cary, NC (US); Daniel Pierce Armstrong, Apex, NC (US)

(73) Assignee: ABB Schweiz AG, Baden (CH)

(*) Notice: Subject to any disclaimer, the term of this patent is extended or adjusted under 35 U.S.C. 154(b) by 181 days.

(21) Appl. No.: 17/091,480

(22) Filed: Nov. 6, 2020

(65) Prior Publication Data

US 2022/0143920 A1    May 12, 2022

(51) Int. Cl.
| | |
|---|---|
| *B33Y 30/00* | (2015.01) |
| *B29C 64/209* | (2017.01) |
| *B29C 64/393* | (2017.01) |
| *B33Y 10/00* | (2015.01) |
| *B33Y 50/02* | (2015.01) |

(52) U.S. Cl.
CPC .......... *B29C 64/393* (2017.08); *B29C 64/209* (2017.08); *B33Y 10/00* (2014.12); *B33Y 30/00* (2014.12); *B33Y 50/02* (2014.12)

(58) Field of Classification Search
CPC ..... G01B 17/00; B29C 31/045; B29C 31/044; B29C 31/042
See application file for complete search history.

(56) References Cited

U.S. PATENT DOCUMENTS

| | | | |
|---|---|---|---|
| 4,485,387 A | | 11/1984 | Drumheller |
| 5,666,325 A | * | 9/1997 | Belser .............. G01B 17/00 73/598 |
| 7,262,861 B1 | * | 8/2007 | Pepper .............. G01B 17/02 356/502 |
| 2008/0260482 A1 | * | 10/2008 | Henrikson ......... G01N 29/265 73/632 |
| 2012/0153032 A1 | * | 6/2012 | Svanebjerg ............ B64F 5/23 239/1 |
| 2014/0048970 A1 | * | 2/2014 | Batchelder .......... B29C 64/106 264/129 |

* cited by examiner

*Primary Examiner* — Mohammad M Ameen
(74) *Attorney, Agent, or Firm* — Armstrong Teasdale LLP

(57) ABSTRACT

Technologies for non-contact displacement control are disclosed. An additive manufacturing system may include a dispenser having a tip configured to deposit an additive material onto a substrate, a transducer coupled to the dispenser and configured to transmit an emitted signal from the dispenser to the substrate, and a sensor coupled to the dispenser and configured to detect a return signal from the substrate to the dispenser, where the return signal is indicative of a distance between the tip of the dispenser and the substrate.

20 Claims, 5 Drawing Sheets

TECHNOLOGIES FOR NON-CONTACT DISPLACEMENT CONTROL

TECHNICAL FIELD

The present disclosure relates to technologies for non-contact displacement control for additive manufacturing and, in particular, additive manufacturing on irregular substrates.

BACKGROUND

Additive manufacturing traditionally occurs by dispensing a material on a print surface with known defects that do not exceed an acceptable tolerance. In most cases, additive manufacturing utilizes a reusable print surface that can be machined precisely. However, this level of precision becomes less practical when using additive manufacturing on a substrate embedded in the resultant part (meaning that the print surface is not reusable). The additional cost to precisely machine each substrate may become prohibitive. This issue is exasperated as the substrate being consumed has wider tolerances due to defects resulting from lower cost volume manufacturing. By way of illustrative example, ceramics used as printing substrates for high voltage resistors and integrated voltage dividers can have significant, unique surface defects that must be addressed to deposit a high precision resistive path on the substrate.

One prior art solution for precision displacement control on an irregular print surface involves using a dispensing pressure of the ink or paste on a cantilevered dispenser to raise the dispenser off the surface of the substrate. This approach requires multiple, high precision control processes to balance the dispenser height and dispensing pressure during transient periods and, thus, is prohibitively expensive and only attractive for low volume runs in industries tolerating relatively high manufacturing costs.

SUMMARY

The present disclosure includes one or more of the features recited in the appended claims and/or the following features which, alone or in any combination, may comprise patentable subject matter.

According to one aspect of the present disclosure, an additive manufacturing system may comprise a dispenser having a tip configured to deposit an additive material onto a substrate, a transducer coupled to the dispenser and configured to transmit an emitted signal from the dispenser via the additive material to the substrate, and a sensor coupled to the dispenser and configured to detect a return signal coupled from the substrate via the additive material to the dispenser, where the return signal is indicative of a distance between the tip of the dispenser and the substrate.

In some embodiments, the transducer may comprise a piezoelectric transducer configured to generate vibrations in the tip of the dispenser. The vibrations may be ultrasonic vibrations. In some embodiments, the piezoelectric transducer may also be configured to detect vibrations to serve as the sensor. In other embodiments, the sensor may comprise an additional piezoelectric transducer configured to detect vibrations.

In some embodiments, the system may further comprise an actuator configured to adjust the distance between the tip of the dispenser and the substrate based on an attenuation of the return signal relative to the emitted signal.

In some embodiments, a variation between the return signal and the emitted signal may result from viscoelastic losses in the additive material.

In some embodiments, the sensor may be further configured to determine a hardness of the substrate based on the return signal.

In some embodiments, the dispenser may be configured to deposit the additive material onto a non-planar surface of the substrate.

In some embodiments, the dispenser may be configured to deposit the additive material with a thickness that is less than $\frac{1}{100}$ of a thickness of substrate.

According to one aspect of the present disclosure, a method of additive manufacturing may comprise depositing an additive material onto a substrate from a tip of a dispenser, energizing a transducer coupled to the dispenser to transmit an emitted signal from the tip of the dispenser via the additive material to the substrate, and detecting, with a sensor coupled to the dispenser, a return signal coupled from the substrate via the additive material to the dispenser, where the return signal is indicative of a distance between the tip of the dispenser and the substrate.

In some embodiments, a variation between the return signal and the emitted signal may result from viscoelastic losses in the additive material. In some embodiments, energizing the transducer may generate vibrations in the tip of the dispenser. The vibrations may be ultrasonic vibrations.

In some embodiments, the transducer may be a piezoelectric transducer. In some embodiments, detecting the return signal may comprise detecting vibrations with the piezoelectric transducer. In other embodiments, detecting the return signal may comprise detecting vibrations with an additional piezoelectric transducer.

In some embodiments, the method may further comprise adjusting the distance between the tip of the dispenser and the substrate based on an attenuation of the return signal relative to the emitted signal.

In some embodiments, the method may further comprise determining a hardness of the substrate using based on the return signal.

In some embodiments, depositing the additive material onto the substrate may comprise depositing the additive material onto a non-planar surface of the substrate.

In some embodiments, a thickness of the additive material deposited onto the substrate may be less than $\frac{1}{100}$ of a thickness of substrate.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. The detailed description particularly refers to the accompanying figures in which.

DETAILED DESCRIPTION OF THE DRAWINGS

Figure 1:
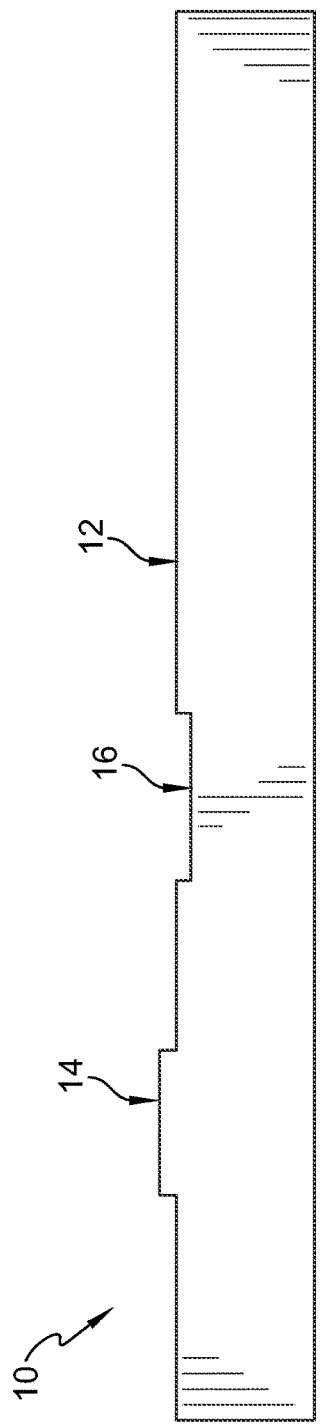
FIG. 1 is a diagram of an irregular substrate onto which additive material is to be dispensed.

While the concepts of the present disclosure are susceptible to various modifications and alternative forms, specific embodiments thereof have been shown by way of example in the figures and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The embodiments described herein relate to a method of detecting variations in sonic or ultrasonic vibrations within a medium to determine a relative position of an object with respect to another while a viscous liquid exists between the objects. Piezoelectric transducers are used to induce vibrations and detect vibrations in a dispenser. These transducers can be mounted in a pitch-catch configuration (using one piezoelectric transducer to continuously induce the sonic or ultrasonic vibrations in the dispenser and an additional piezoelectric transducer to continuously detect the vibrations) or a pulse-echo configuration (a single piezoelectric transducer is used to induce vibrations and to detect the resultant vibrations). The dispenser tip's proximity to the substrate surface, while dispensing a viscous fluid, changes the resultant force that the fluid exerts on the dispenser tip. This force attenuates or otherwise modifies the sensitive sonic or ultrasonic vibrations within the dispenser.

Referring to FIG. 1, an irregular substrate 10 onto which additive material is to be dispensed is shown as a simplified diagram. In the illustrative embodiment, the substrate 10 is a dielectric substrate (e.g., a ceramic or plastic material). The substrate 10 includes a surface 12 that is configured to receive a conductive material, e.g. a conductive paste 26, applied using additive manufacturing. As used herein, the term "conductive" refers to materials that are conductive or semi-conductive, for example, more conductive than the substrate 10. The surface 12 includes irregularities, such as raised portions 14 and/or recessed portions 16. In some embodiments, the surface 12 is non-planar (e.g., the substrate 10 may be generally cylindrical in shape).

Figure 2:
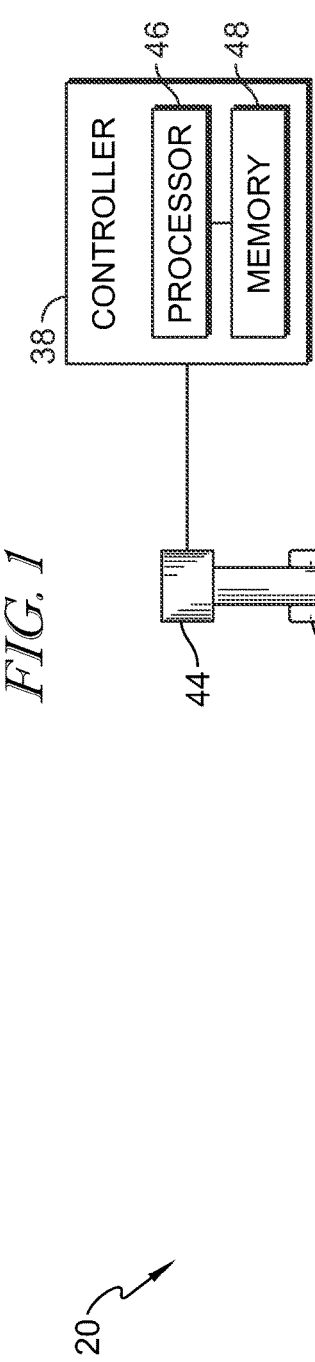
FIG. 2 is a diagram of one illustrative embodiment of an additive manufacturing system dispensing additive material onto the substrate of FIG. 1.

Referring now to FIG. 2, an additive manufacturing system 20 includes a dispenser 22 having a dispensing tip 24. For example, the dispenser 22 may be embodied as a dispensing needle (see FIGS. 3 and 4, for example). In other embodiments, the dispenser 22 may be embodied as a nozzle of an extruder of a fused deposition modeling system. It still other embodiments, other types of additive manufacturing (e.g., screen printing) may be used.

The tip 24 of the dispenser 22 is moved along the surface 12 of the substrate 10 to apply the conductive paste 26 to the surface 12. The dispenser 22 includes a transducer 30 that transmits an emitted signal from the dispenser 22 via the conductive paste 26 to the substrate 10. For example, the transducer 30 may be a piezoelectric transducer, and the emitted signals may be sonic or ultrasonic vibrations. The emitted signal interacts with the surface 12, and a return signal is coupled from the substrate 10 via the conductive paste 26 back to the dispenser 22. For example, the return signal may also be a sonic or ultrasonic vibration. Another transducer 32, acting as a sensor, receives the return signal. The transducer 32 may also be a piezoelectric transducer. In some embodiments, the transducer 30 and the sensor 32 are embodied in a single piezoelectric transducer. In some embodiments, an emitted signal may be sent from the energized transducer, and the transducer may then change state to stop sending the emitted signal and to act as a sensor to receive the return signal. In such embodiments, the transducer sends emitted signal pulses and receives return signals between each emitted signal pulse. In other embodiments, a single transducer may be used to transmit and receive signals simultaneously.

Figure 3:
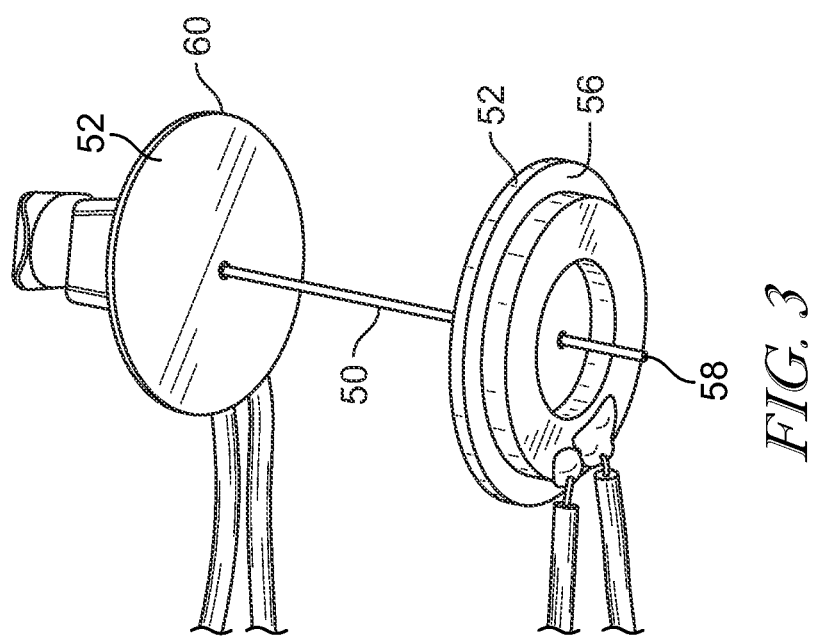
FIG. 3 is a perspective view of dispenser (specifically, a needle) formed in accordance with one embodiment for performing additive manufacturing.

FIG. 3 illustrates one embodiment of the dispenser 22 in the form of a needle 50 having 1.7 MHz transducers 52 attached thereto using adhesive or brazing. The transducers 52 are positioned around a circumference of the needle 50. In other embodiments, the transducers 52 may be attached to a side of the needle 50 and may not fully encircle the needle 50. A first transducer 56 is positioned near the tip 58 of the needle 50 to act as a transmitter. A second transducer 60 is positioned further from the tip 58 of the needle 50 to act as a sensor. As set forth above, a single transducer 52 may operate as both the transmitter and the sensor.

Figure 4:
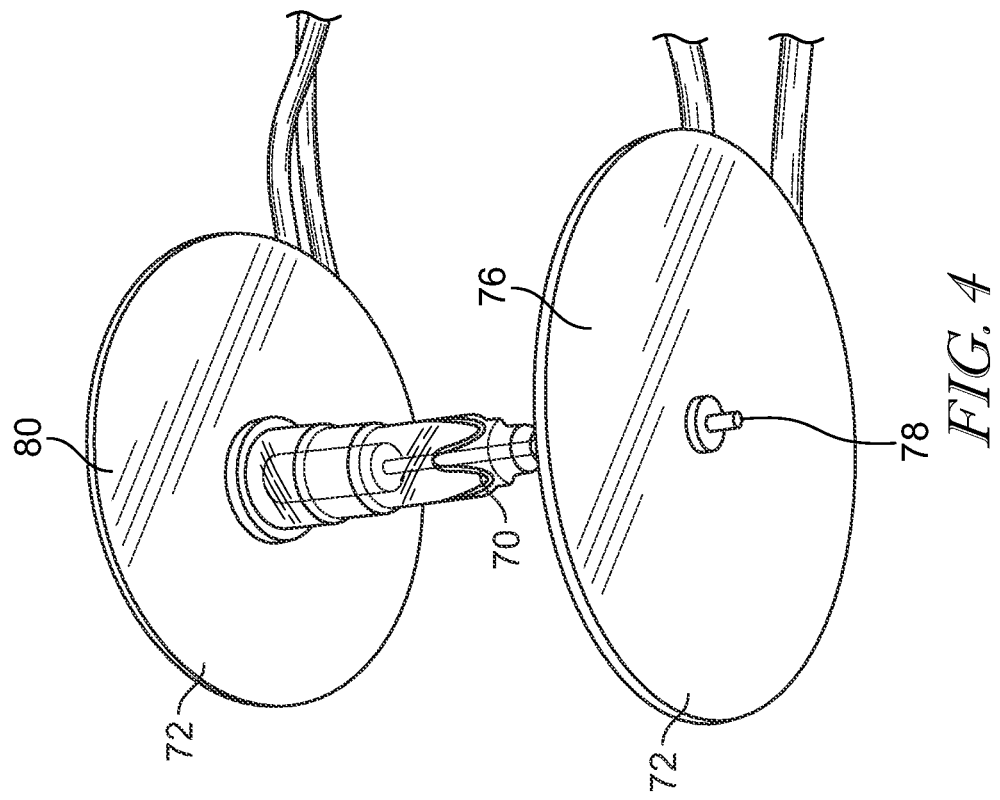
FIG. 4 is a perspective of another needle formed in accordance with another embodiment for performing additive manufacturing.

FIG. 4 illustrates another embodiment of the dispenser 22 in the form of a needle 70 having 4.6 kHz transducers 72 attached thereto using adhesive or brazing. The transducers 72 are positioned around a circumference 74 of the needle 70. In other embodiments, the transducers 72 may be attached to a side of the needle 70 and may not fully encircle the needle 70. A first transducer 76 is positioned near the tip 78 of the needle 70 to act as a transmitter. A second transducer 80 is positioned further from the tip 78 of the needle 70 to act as a sensor. As set forth above, a single transducer 72 may operate as both the transmitter and the sensor.

The frequency of the transducer(s) may be altered within a range of 1 kHz and 25 MHz for use with different conditions (e.g., substrates with varying rigidity, fluids with varying viscosity, etc.). For example, certain substrate materials may return signals better when the emitted signals are at a higher frequency, and other substrates may return signals better when the emitted signals are at a lower frequency. Additionally, fine tuning of the additive manufacturing process may require lower or higher frequencies depending on the material of the substrate 10 and the material of the conductive paste 26.

Referring back to FIG. 2, the transducer 32 detects a variation of between the return signal and the emitted signal that results from viscoelastic losses in the dispensed paste 26 (or other additive material) that extends between the dispenser 22 and the substrate 10. For example, in some embodiments, an attenuation of the return signal (relative to the emitted signal) is indicative of a distance from the tip 24 of the dispenser 22 to the surface 12. Accordingly, as the tip 24 passes over the raised portions 14 and/or recessed portions 16 of the surface 12, the attenuation is altered. These changes in signal attenuation are then utilized to alter the distance of the tip 24 of the dispenser 22 from the surface 12. An actuator 44 moves the dispenser 22 along an axis that is perpendicular to the surface 12. Accordingly, the actuator 44 may move the dispenser tip 24 closer to or further away from the surface 12. By altering the distance of the tip 24 from the surface 12, the conductive paste 26 is applied evenly to the surface 12. That is, the tip 24 may be lowered to cover the recessed portions 16 and raised to cover the raised portions 14. In this way, the attenuation of the return signal acts as a low force sensor. In other embodiments, the return signal detected by the sensor 32 may be utilized to determine hardness or other material properties of the substrate.

A controller 38 is in communication with the transducer 30 and the transducer 32. The controller 38 includes a processor 46 and a memory 48. The memory 48 includes instructions that when executed by the processor 46 enable the controller 38 to receive return signals from the transducer 32 indicative of the frequency of the return signal. The controller 38, in response to the frequency, operates the actuator 44 to raise or lower the tip 24 of the dispenser 22 relative to the surface 12 of the substrate 10.

Figure 5:
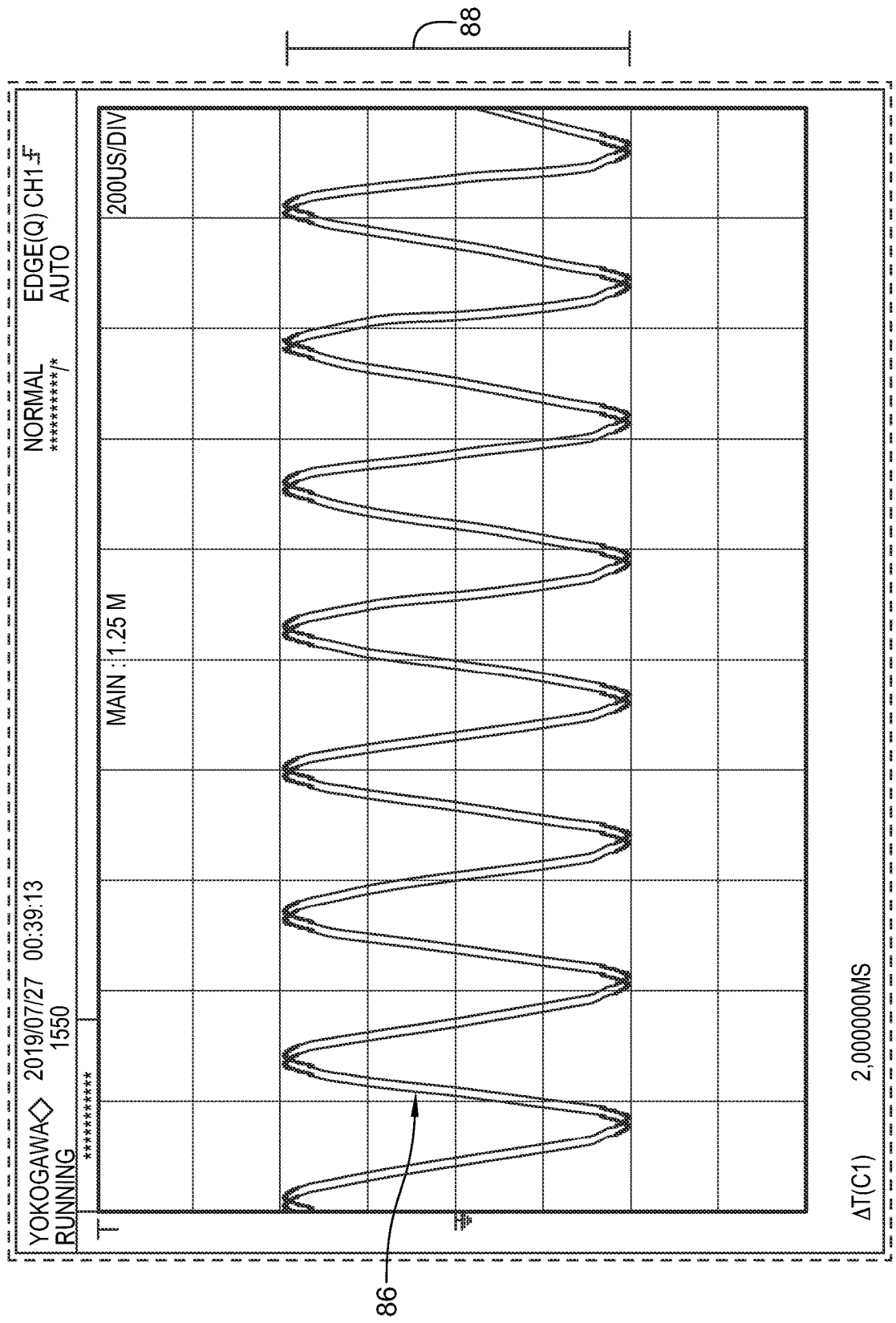
FIG. 5 illustrates an exemplary return signal when there is no contact between a tip of a dispenser and a substrate.
Figure 6:
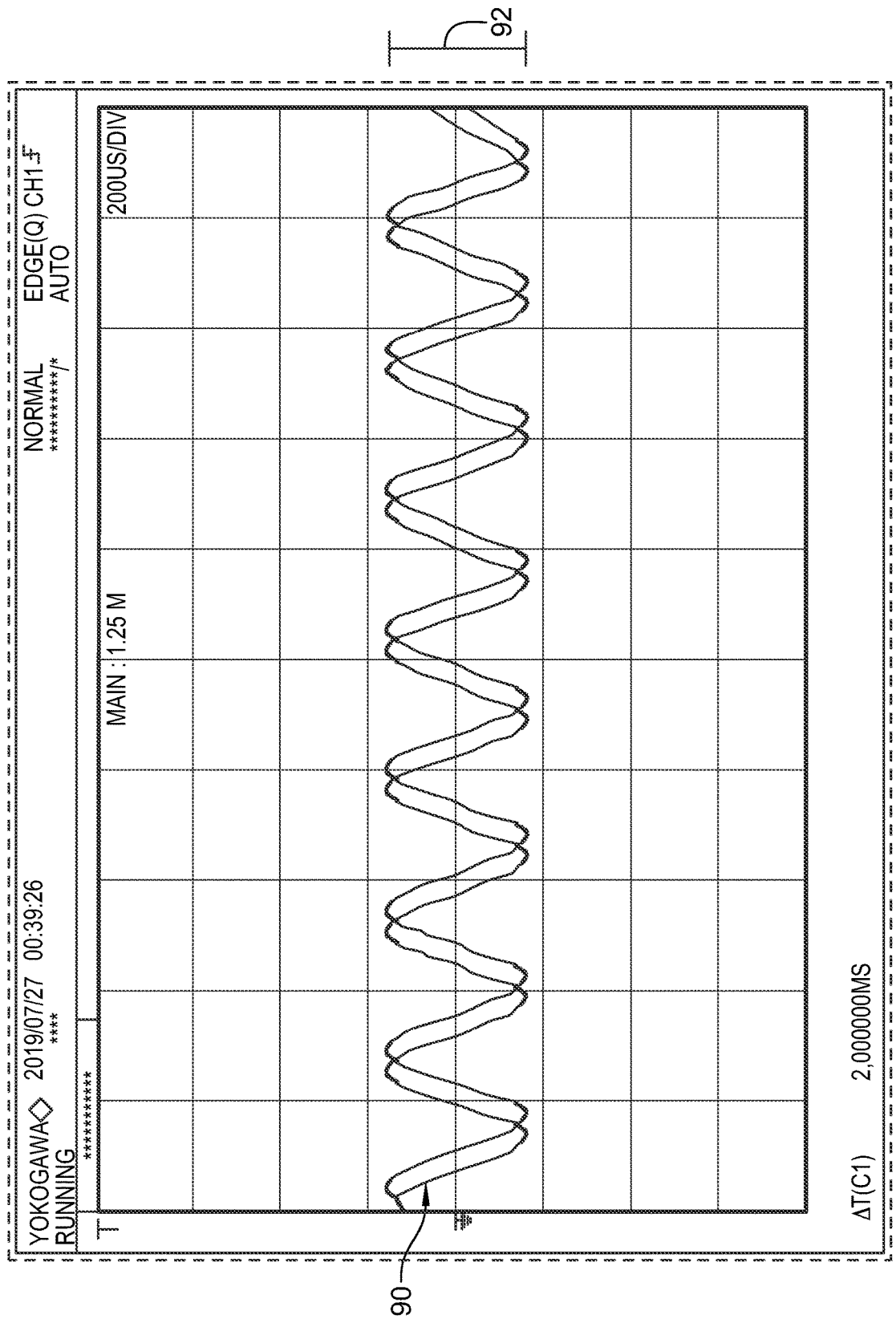
FIG. 6 illustrates an exemplary return signal when there is contact between a tip of a dispenser and a plastic substrate.

Referring now to FIG. 5, one illustrative return signal 86 is displayed. The signal 86 is indicative of a dispenser tip 24 that is not in contact with the substrate 10. FIG. 6 illustrates another example return signal 90. The return signal 90 is indicative of a dispenser tip 24 that is in contact with a plastic substrate 10. Notably, the return signal 86 has a higher amplitude 88 than the amplitude 92 of return signal 90. Accordingly, the closer the tip 24 is to the surface 12, the lower the amplitude of the return signal. Accordingly, the controller 38 can monitor attenuation in the amplitude of the return signal to determine a position of the dispenser tip 24 relative to the surface 12. As the system 20 applies the conductive paste 26 to the surface 12, increases in the amplitude are indicative of the tip having reached a recessed portion 16 where the dispenser is further from the surface 12. In response, the controller 38 lowers the dispenser tip 24 to uniformly apply the conductive paste 26 to the recessed portion 16. In contrast, decreases in the amplitude are indicative of the dispenser tip 24 passing over a raised portion 14 of the surface 12. In response, the controller 38 raises the dispenser tip 24 to uniformly apply the conductive paste 26 to the raised portion 14.

Figure 7:
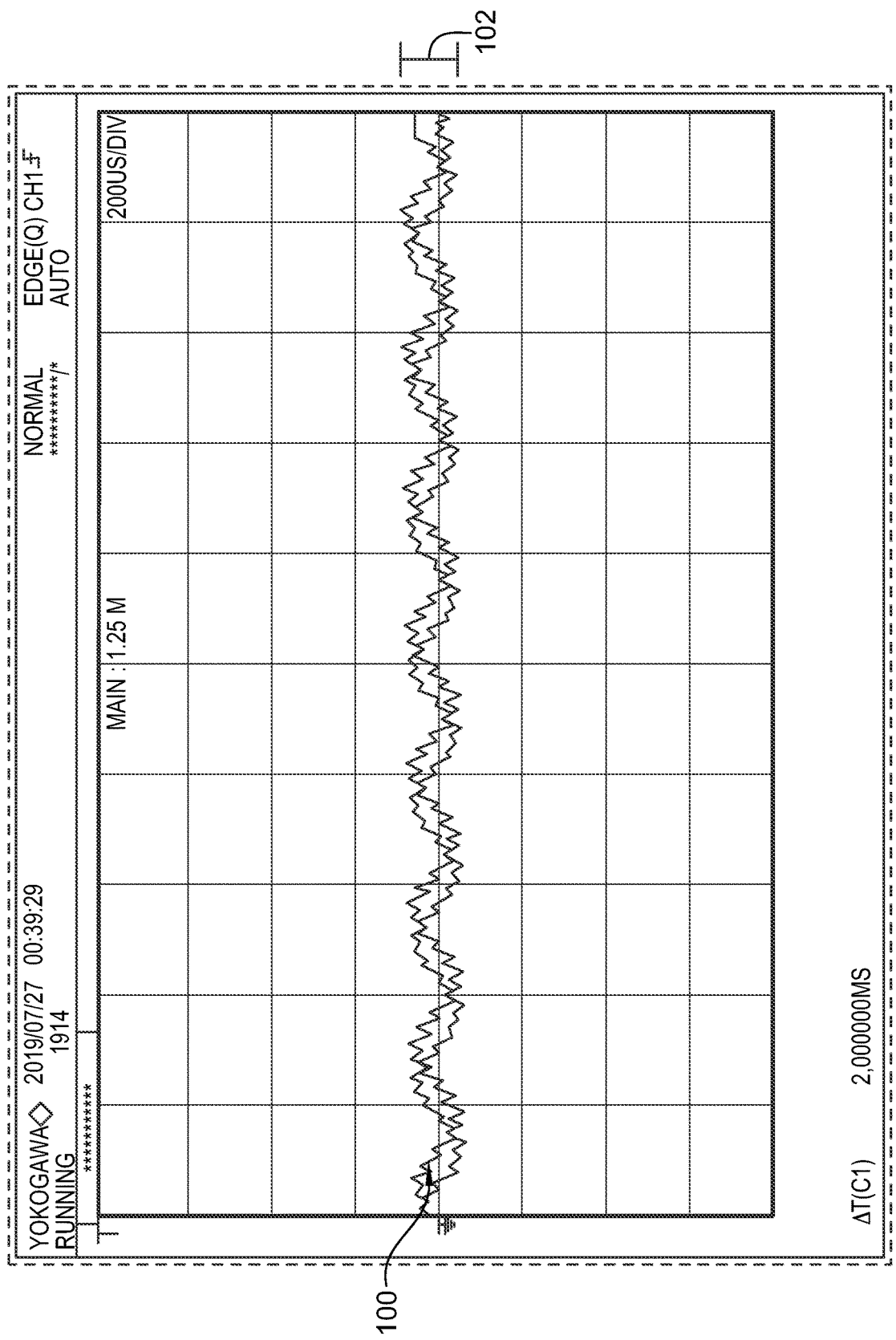
FIG. 7 illustrates an exemplary return signal when there is contact between a tip of a dispenser and a steel substrate.

FIG. 7 illustrates yet another illustrative return signal 100. The return signal 100 is indicative of the dispenser tip 24 being in contact with a steel substrate 10. Notably, the signal 100 has a lower amplitude 102 than the amplitude 92 of return signal 90. That is, harder surfaces (e.g. steel), produce lower amplitudes than softer materials, e.g. plastic. As such, the amplitude of the return signal may be utilized to determine a hardness of the substrate material.

The disclosed embodiments provide precision dispenser height readings relative to the surface of the arbitrary substrate. With active vertical dispenser displacement control, the dispenser can be held at a constant displacement from the surface. The system adapts to deformed surfaces or defects and can be used on substrates with unknown, difficult to model or unusual geometries. The disclosed embodiments reduce the costs and overall complexity of manufacturing and can be used for higher volume products. The disclosed embodiments are less sensitive to external factors and allow mass produced, lower precision substrates to be used for precision high voltage resistors and integrated voltage dividers.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the methods, systems, and articles described herein. It will be noted that alternative embodiments of the methods, systems, and articles of the present disclosure may not include all of the features described yet still benefit from at least some of the advantages of such features. Those of ordinary skill in the art may readily devise their own implementations of the methods, systems, and articles that incorporate one or more of the features of the present disclosure.

The invention claimed is:

1. An additive manufacturing system comprising:
   a dispenser comprising a needle having a tip configured to deposit an additive material onto a substrate;
   a transducer coupled to the dispenser and encircling the needle, wherein the transducer is positioned proximate to the tip of the needle and configured to transmit an emitted signal from the dispenser via the additive material to the substrate; and
   a sensor coupled to the dispenser and encircling the needle, wherein the sensor is positioned farther away from the tip of the needle than the transducer and is configured to detect a return signal coupled from the substrate via the additive material to the dispenser, the return signal being indicative of a distance between the tip of the dispenser and the substrate.

2. The system of claim 1, wherein the transducer comprises a piezoelectric transducer configured to generate vibrations in the tip of the dispenser.

3. The system of claim 2, wherein the sensor comprises an additional piezoelectric transducer configured to detect vibrations.

4. The system of claim 2, wherein the piezoelectric transducer is also configured to detect vibrations to serve as the sensor.

5. The system of claim 2, wherein the vibrations are ultrasonic vibrations.

6. The system of claim 1, further comprising an actuator configured to adjust the distance between the tip of the dispenser and the substrate based on an attenuation of the return signal relative to the emitted signal.

7. The system of claim 1, wherein a variation between the return signal and the emitted signal is indicative of viscoelastic losses in the additive material.

8. The system of claim 1, wherein the sensor is further configured to determine a hardness of the substrate based on the return signal.

9. The system of claim 1, wherein the dispenser is configured to deposit the additive material uniformly onto a non-planar surface of the substrate, and wherein the tip of the dispenser maintains a constant displacement from the non-planar surface based on the return signal.

10. A method of additive manufacturing, the method comprising:
depositing an additive material onto a substrate from a tip of a dispenser comprising a needle;
energizing a transducer coupled to the dispenser to transmit an emitted signal from the tip of the dispenser via the additive material to the substrate, wherein the transducer encircles the needle and is positioned proximate to the tip of the needle; and
detecting, with a sensor coupled to the dispenser, a return signal coupled from the substrate via the additive material to the dispenser, the return signal being indicative of a distance between the tip of the dispenser and the substrate, wherein the sensor encircles the needle and is positioned farther away from the tip of the needle than the transducer.

11. The method of claim 10, wherein a variation between the return signal and the emitted signal is indicative of viscoelastic losses in the additive material.

12. The method of claim 10, wherein energizing the transducer generates vibrations in the tip of the dispenser.

13. The method of claim 12, wherein the vibrations are ultrasonic vibrations.

14. The method of claim 12, wherein the transducer is a piezoelectric transducer.

15. The method of claim 14, wherein detecting the return signal comprises detecting vibrations with the piezoelectric transducer.

16. The method of claim 14, wherein detecting the return signal comprises detecting vibrations with an additional piezoelectric transducer.

17. The method of claim 10, further comprising adjusting the distance between the tip of the dispenser and the substrate based on an attenuation of the return signal relative to the emitted signal.

18. The method of claim 10, further comprising determining a hardness of the substrate using based on the return signal.

19. The method of claim 10, wherein depositing the additive material onto the substrate comprises depositing the additive material uniformly onto a non-planar surface of the substrate, and wherein the tip of the dispenser maintains a constant displacement from the non-planar surface based on the return signal.

20. The method of claim 10, wherein a thickness of the additive material deposited onto the substrate is less than $1/100$ of a thickness of the substrate.

* * * * *